United States Patent
Kojima

(10) Patent No.: US 7,321,977 B2
(45) Date of Patent: Jan. 22, 2008

(54) INFORMATION PROCESSING APPARATUS AND METHOD

(75) Inventor: Tamaki Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 414 days.

(21) Appl. No.: 10/504,095

(22) PCT Filed: Feb. 12, 2003

(86) PCT No.: PCT/JP03/01418

§ 371 (c)(1),
(2), (4) Date: Aug. 11, 2004

(87) PCT Pub. No.: WO03/075137

PCT Pub. Date: Sep. 12, 2003

(65) Prior Publication Data

US 2005/0182982 A1    Aug. 18, 2005

(30) Foreign Application Priority Data

Mar. 4, 2002    (JP) .............................. 2002-057929

(51) Int. Cl.
*G06F 7/00*    (2006.01)
(52) U.S. Cl. ...................................... 713/500; 713/322
(58) Field of Classification Search ................ 713/322, 713/500
See application file for complete search history.

(56) References Cited

U.S. PATENT DOCUMENTS 5,319,772 A * 6/1994 Hwang ........................ 713/501
5,721,872 A * 2/1998 Katsuta ....................... 711/163
6,378,068 B1 * 4/2002 Foster et al. .................... 713/1
6,457,135 B1 * 9/2002 Cooper ......................... 713/323
6,704,879 B1 * 3/2004 Parrish ........................ 713/322
6,845,415 B2 * 1/2005 Chen et al. .................... 710/72
6,988,214 B1 * 1/2006 Verdun ........................ 713/320

FOREIGN PATENT DOCUMENTS

| JP | 11-296251 | 10/1999 |
| JP | 2001-154763 | 6/2001 |
| JP | 2002-41495 | 2/2002 |

* cited by examiner

*Primary Examiner*—Thomas Lee
*Assistant Examiner*—Vincent T Tran
(74) *Attorney, Agent, or Firm*—Oblon, Spivak, McClelland, Maier & Neustadt, P.C.

(57) ABSTRACT

The present invention relates to an information processing apparatus and method capable of avoiding communication interruptions during communication. In an apparatus having a function of dynamically changing a frequency of a CPU 51, when a source supplying a power supply voltage supplied is switched, it is determined whether or not communication performed by a modem 62 is in progress. If the communication is in progress, information written in a register 211 is information indicating that transition of the frequency of the CPU 51 is not permissible. This information is updated to a frequency transition permissible state. Then, the frequency of the CPU 51 is transitioned to a suitable frequency for the current situation. After the frequency has been transitioned, the information of the register 211 is updated again into information indicating that transition of the frequency is not permissible. The present invention is applicable to a personal computer having a function of transitioning the CPU frequency.

7 Claims, 8 Drawing Sheets

INFORMATION PROCESSING APPARATUS AND METHOD

TECHNICAL FIELD

The present invention relates to an information processing apparatus and method, and particularly relates to an information processing apparatus and method suitable for dynamically changing the frequency of a CPU in a personal computer.

BACKGROUND ART

Recently, CPUs (Central Processing Units) with high frequency and relatively high consumption power have become widespread. Personal computers called portable mobile computers and notebook personal computers (hereinafter referred to as notebook PCs) have also become widespread. For the purpose of portability, notebook PCs are powered by not only an AC power supply but also a battery.

However, if such a CPU with high frequency and high consumption power is used in a notebook PC, it is necessary to reduce the consumption power to extend the battery driving time. In one known method for reducing the consumption power, for example, it is determined whether a power supply voltage is supplied from an AC power supply or is supplied only from a battery, and the CPU clock frequency is lowered to reduce the consumption power if it is determined that a power supply voltage is supplied only from the battery.

Lowering the CPU clock frequency includes reducing the clock frequency itself, and conducting so-called throttling or driving and not driving the CPU (that is, intermittently driving the CPU to reduce the average frequency) to thereby equivalently reduce the frequency.

In activating the above-described function of dynamically changing the CPU frequency (hereinafter referred to as frequency transition (control)), communication performed by a modem can be interrupted, which is troublesome. Such communication interruptions can be caused by, for example, accumulating several hundred milliseconds for frequency transition control as a delay time. Thus, frequency transition control is set inactive during communication performed by a modem.

In the description herein, it is assumed that the CPU frequency is set to a high frequency when a power supply voltage is supplied from an AC power supply, and the CPU frequency is set to a low frequency when a power supply voltage is supplied from a battery.

During communication performed by a modem, if a power supply voltage is supplied from an AC power supply, the CPU frequency is set to a high frequency and frequency transition control is set to be inactive. In this state, even when the supply of power supply voltage is switched from the AC power supply to a battery, the frequency transition control is still inactive, and therefore the CPU frequency is still maintained at a high frequency.

Since the CPU frequency is still high although a power supply voltage is supplied from the battery, a problem occurs in that the operating time of the personal computer is shortened.

Conversely, during communication performed by the modem, if a power supply voltage is supplied from the battery, the CPU frequency is set to a low frequency and frequency transition control is set to be inactive. In this state, even when the supply of power supply voltage is switched from the battery to the AC power supply, frequency transition control is still inactive, and therefore the CPU frequency is still maintained at a low frequency.

Since the CPU frequency is still low although a power supply voltage is supplied from the AC power supply, a problem occurs in that the processing speed of the personal computer becomes low.

That is, a problem occurs is that even when the source of power supply voltage is changed during communication performed by the modem, the CPU frequency is not set (transitioned) to a suitable frequency for the current state. Such a problem can be experienced not only during communication performed by the modem but also in performing frequency transition control.

DISCLOSURE OF INVENTION

In view of such a background, it is an object of the present invention to suitably set the CPU frequency during communication performed by a modem or the like.

An information processing apparatus according to the present invention includes changing means for changing a frequency of a clock, storing means for storing information indicating whether or not change of the frequency of the clock by the changing means is permissible, updating means for, when the information stored in the storing means is information indicating that the change of the frequency of the clock is not permissible, updating the information stored in the storing means into information indicating that the change of the frequency of the clock is permissible when the changing means changes the frequency of the clock, and resetting means for resetting the information stored in the storing means to the information indicating that the change of the frequency of the clock is not permissible after the information has been updated by the updating means and after the frequency of the clock has been changed by the changing means.

The changing means may change the frequency of the clock when a source supplying a power supply voltage is changed.

The updating means and the resetting means may perform the processing according to a BIOS.

An information processing method according to the present invention includes a changing step of changing a frequency of a clock, a storage controlling step of controlling storage of information indicating whether or not change of the frequency of the clock in the changing step is permissible, an updating step of, when the information stored in the storage controlling step is information indicating that the change of the frequency of the clock is not permissible, updating the information stored in the storage controlling step into information indicating that the change of the frequency of the clock is permissible when the frequency of the clock is changed in the changing step, and a resetting step of resetting the information stored in the storage controlling step to the information indicating that the change of the frequency of the clock is not permissible after the information has been updated in the updating step and after the frequency of the clock has been changed in the changing step.

A program according to the present invention causes a computer for controlling an information processing apparatus to execute a changing step of changing a frequency of a clock, a storage controlling step of controlling storage of information indicating whether or not change of the frequency of the clock in the changing step is permissible, an updating step of, when the information stored in the storage controlling step is information indicating that the change of the frequency of the clock is not permissible, updating the information stored in the storage controlling step into information indicating that the change of the frequency of the clock is permissible when the frequency of the clock is changed in the changing step, and a resetting step of resetting the information stored in the storage controlling step to the information indicating that the change of the frequency of the clock is not permissible after the information has been updated in the updating step and after the frequency of the clock has been changed in the changing step.

In the information processing apparatus and method, and program according to the present invention, assuming that information indicates that change of a frequency of a clock is not permissible, when the frequency of the clock is changed, the current information stored is updated into information indicating that the change of the frequency of the clock is permissible so that the frequency of the clock can be changed, and the frequency of the clock is changed to a desired frequency. Then, the stored information is reset to the initial information indicating that the change of the frequency of the clock is not permissible.

BEST MODE FOR CARRYING OUT THE INVENTION

An embodiment of the present invention will now be described with reference to the drawings. FIGS. 1 through 4 show the appearance of a personal computer 1.

Figure 1:
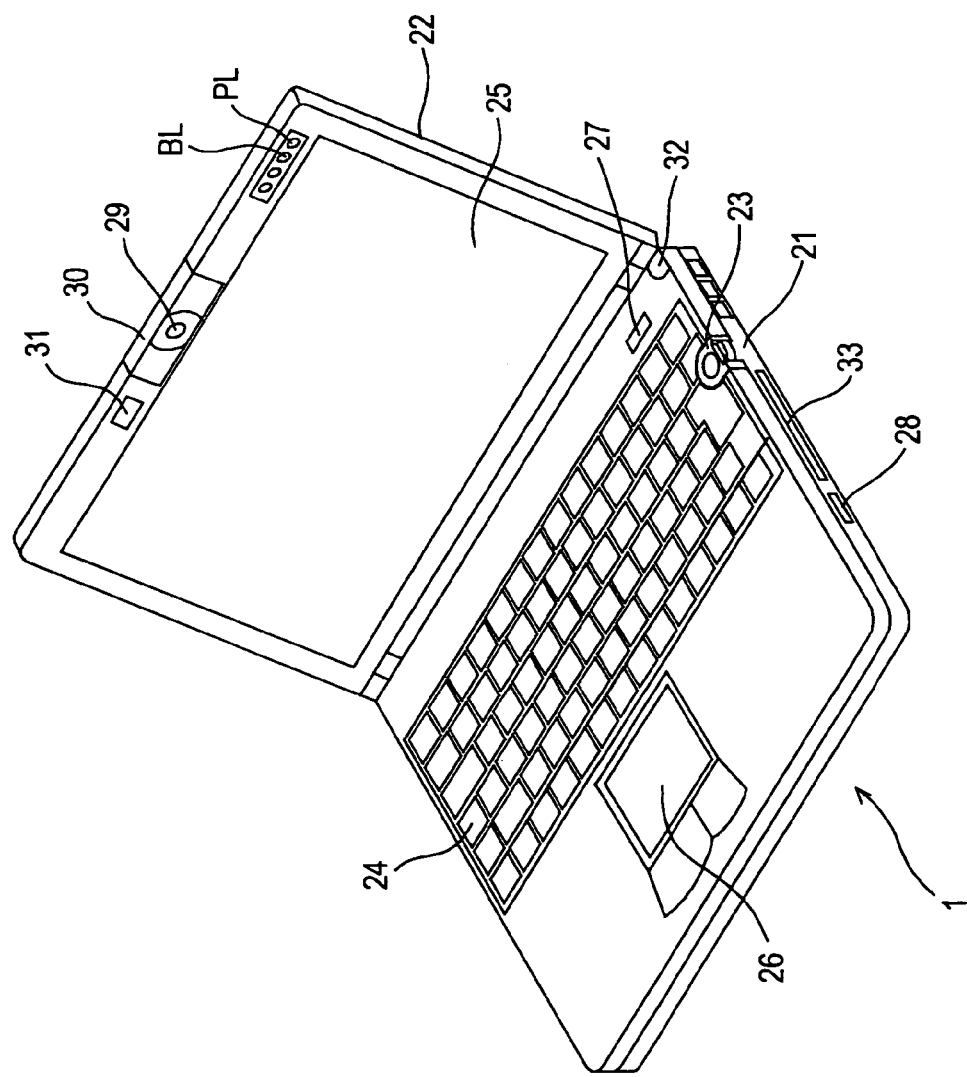
FIG. 1 is an external perspective view of a personal computer.
Figure 2:
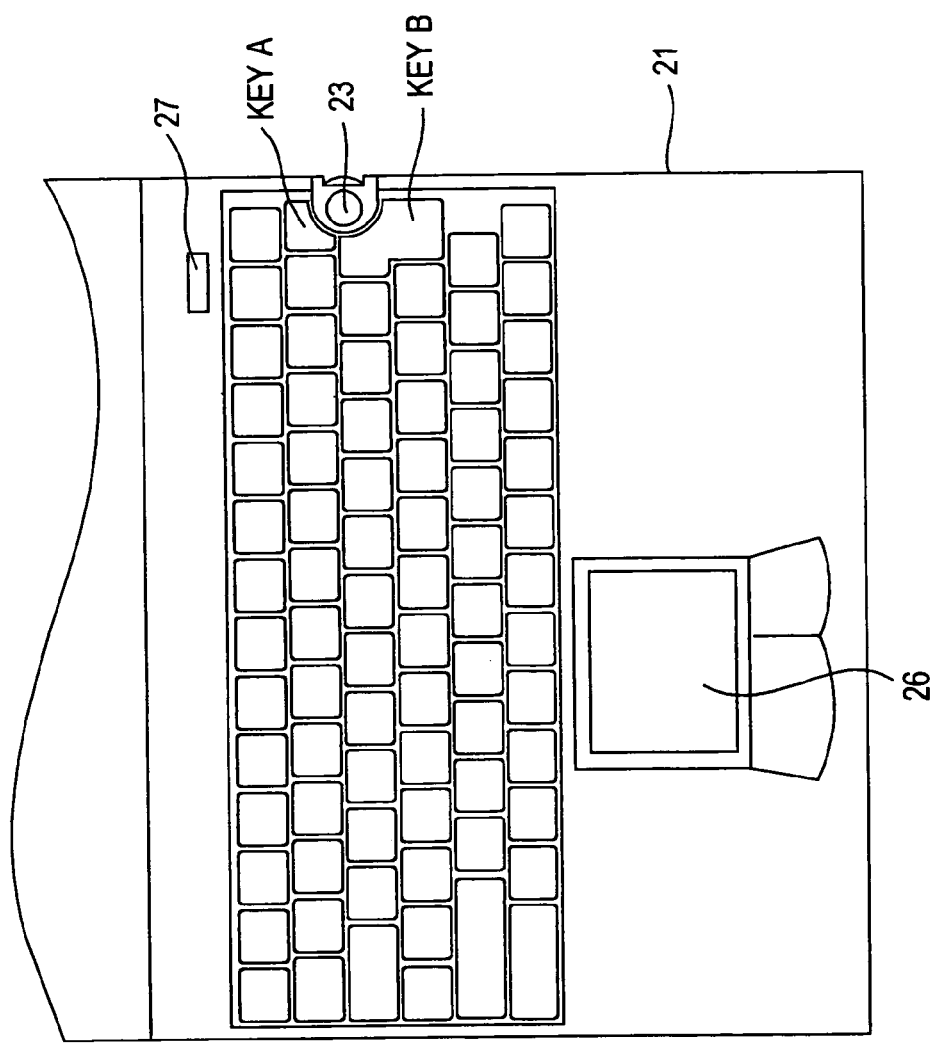
FIG. 2 is a plan view of a body of the personal computer shown in FIG. 1.
Figure 3:
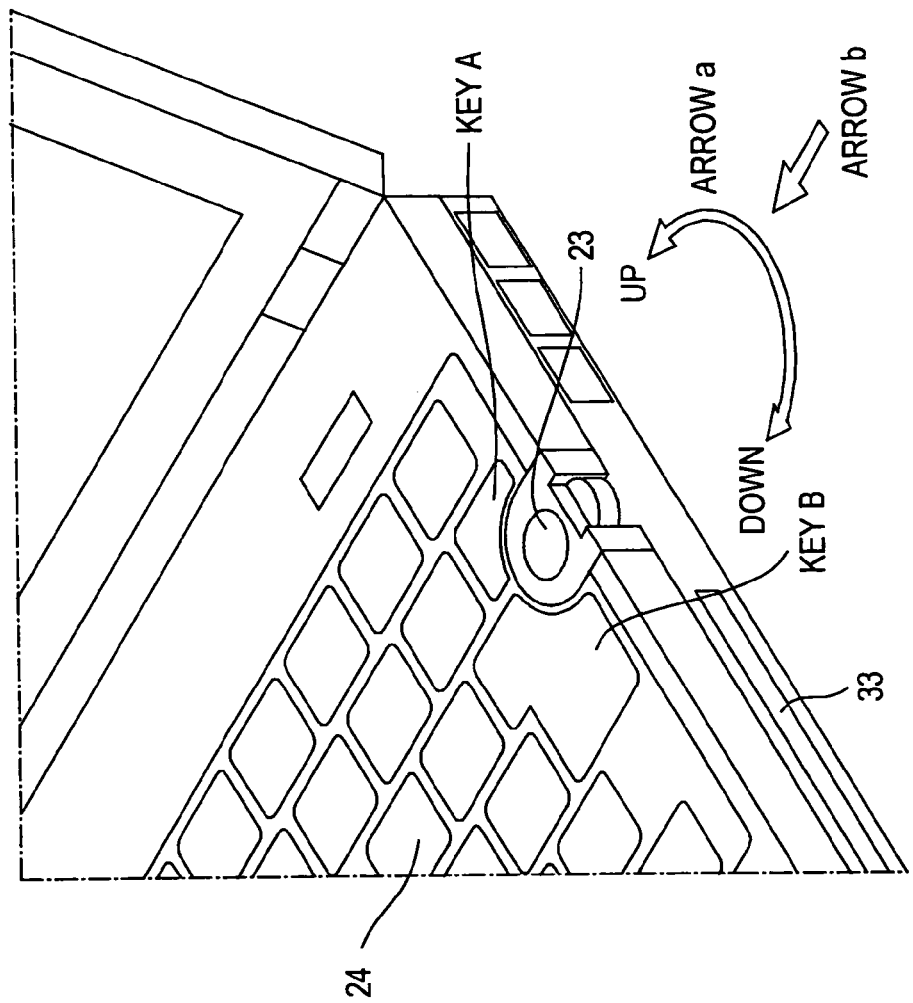
FIG. 3 is an enlarged view of the vicinity of a jog dial in the body of the personal computer shown in FIG. 1.
Figure 4:
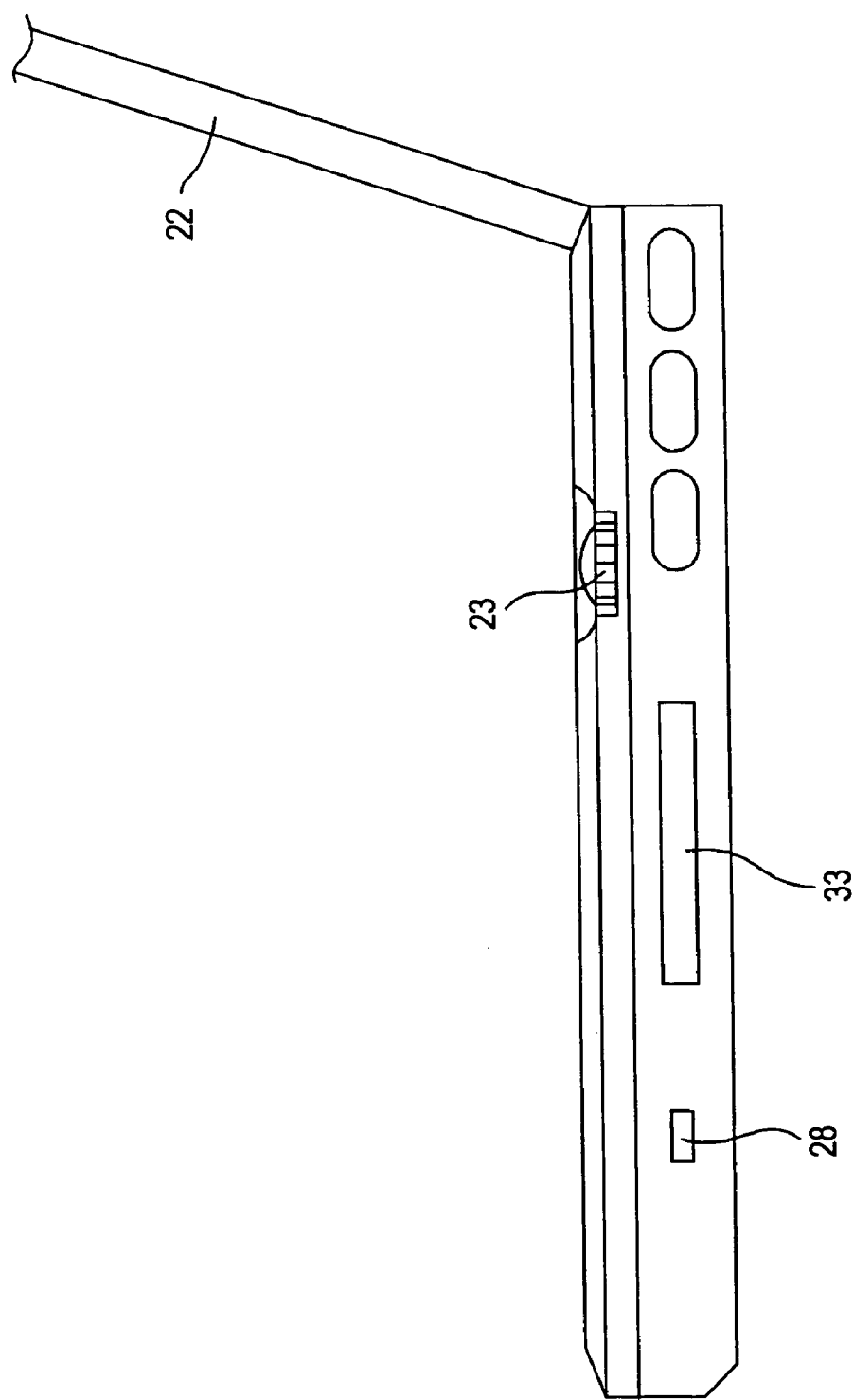
FIG. 4 is a diagram showing the structure of the right side portion of the personal computer shown in FIG. 1.

Basically, the personal computer 1 is formed of a body 21, and a display unit 22 that is openable and closable with respect to the body 21. FIG. 1 is an external perspective view of the personal computer 1, showing that the display unit 22 is open with respect to the body 21. FIG. 2 is a plan view of the body 21, and FIG. 3 is an enlarged view of a jog dial 23 described below that is disposed in the body 21. FIG. 4 is a side view of the jog dial 23 disposed in the body 21.

Disposed on the top surface of the body 21 are a keyboard 24 operated to enter various characters or symbols, a touch pad 26 serving as a pointing device operated to move a pointer (mouse cursor) displayed on an LCD 25, and a power switch 27. A jog dial 23, an IEEE (Institute of Electrical and Electronics Engineers) 1394 port 28, and so on are disposed on a side surface of the body 21. A stick-type pointing device may be disposed in place of the touch pad 26.

The LCD (Liquid Crystal Display) 25 for displaying an image is disposed on the front surface of the display unit 22. A power lamp PL, a battery lamp BL, a message lamp ML (not shown), if necessary, and other LED lamps are disposed on the upper right portion of the display unit 22. An imaging unit 30 having a CCD video camera 29 including a CCD (charge coupled device), and a microphone 31 are disposed on the upper center portion of the display unit 22. A shutter button 32 for operating the CCD video camera 29 is disposed on the upper right side portion of the body 21 in FIG. 1.

The imaging unit 30 is rotatably fixed to the display unit 22. For example, the imaging unit 30 is rotated by the user from the position at which the CCD video camera 29 can photograph the user who operates the personal computer 1 to the position at which the CCD video camera 29 can photograph the scene in the direction of the eye of the user who operates the personal computer 1.

The jog dial 23 is mounted, for example, between keys A and B of the keyboard 24 on the body 21, as indicated at the right side of FIG. 2, so that the top surface of the jog dial 23 is substantially coplanar to the keys A and B. The jog dial 23 performs a predetermined operation (e.g., scrolls on a screen) when it is rotated as indicated by an arrow "a" in FIG. 3, and performs an operation corresponding to a motion indicated by an arrow "b" in FIG. 3 (e.g., sets selection of an icon).

The IEEE 1394 port 28 has a structure that complies with the standard specified in IEEE 1394, and a cable complying with the standard specified in IEEE 1394 is connected to the IEEE 1394 port 28.

An example of the internal structure of the personal computer 1 will now be described with reference to FIG. 5.

A central processing unit (CPU) 51 is implemented by, for example, a Pentium (registered trademark) processor manufactured by Intel Corporation or the like, and is connected to a front side bus (FSB) 52. A north bridge 53 is also connected to the FSB 52. The north bridge 53 has an AGP (Accelerated Graphics Port) 50, and is connected to a hub interface 56.

The north bridge 53 is implemented by, for example, Intel 440BX, which is an AGP host bridge controller manufactured by Intel Corporation, and controls the CPU 51, a RAM (Random Access Memory) 54 (i.e., a so-called main memory), etc. The north bridge 53 also controls a video controller 57 via the AGP 50. The video controller 57 controls the LCD 25 or a VGA (Video Graphics Array) display (hereinafter referred to as a VGA 101).

The video controller 57 receives data (image data, text data, or the like) supplied from the CPU 51, and generates image data corresponding to the received data or stores the received data in an internal video memory (not shown) as it is. The video controller 57 causes the LCD 25 or the VGA 101 to display an image corresponding to the image data stored in the video memory. The LCD 25 or the VGA 101 displays an image, text, or the like based on the data supplied from the video controller 57.

The north bridge 53 is also connected to a cache memory 55. The cache memory 55 is implemented by a memory capable of writing or reading at a higher speed than the RAM 54, such as an SRAM (Static RAM), and caches (temporarily stores) a program used by the CPU 51 or data.

The CPU 51 contains a primary cache memory that is capable of operating at a higher speed than the cache memory 55 and that is controlled by the CPU 51 itself.

The RAM 54 is formed of, for example, a DRAM (Dynamic RAM), and stores the program executed by the CPU 51 or the data necessary for operation of the CPU 51. Specifically, for example, the RAM 54 stores an operating system loaded from an HDD 67 when the starting process is completed, an Internet program, and so on.

The operation system (Operating System (OS)) is a program for controlling basic operations of a computer, such as Windows (registered trademark) XP manufactured by Microsoft Corporation or Mac OS (registered trademark) manufactured by Apple Computer, Inc.

The north bridge 53 is also connected to a south bridge 58 via the hub interface 56. The south bridge 58 is implemented by, for example, Intel PIIX4E, and contains an AC97 link interface 58A, a USB (Universal Serial Bus) interface 58B, an IDE (Integrated Drive Electronics) interface 58C, a PCI (Peripheral Component Interconnect) interface 58D, an LPC (Low Pin Count) interface 58E, an Ether interface 58F, and so on.

The south bridge 58 performs various I/O (Input/Output) controls such as control of devices connected via an AC97 link bus 59, a USB bus 60, and an IDE bus 61.

A modem 62 and a sound controller 63 are connected to the AC link bus 59. The modem 62 is connected to a public telephone line, and performs communication via a public telephone line or the Internet (not shown). The sound controller 63 captures audio from the microphone 31 to generate data corresponding to the audio, and outputs the data to the RAM 54. The sound controller 63 further drives a speaker 102 to output the audio.

A USB connector 64 is connected to the USB bus 60 of the south bridge 58 so that various USB devices are connectable. A memory stick slot 65 and a Bluetooth communication unit 66 are also connected via the USB bus 60. A memory stick (trademark) 103 is connected to the memory stick slot 65.

The memory stick 103 is one type of flash memory card, developed by the present applicant, Sony Corporation. The memory stick 131 stores a flash memory device, which is one type of electrically writable or erasable non-volatile memory or EEPROM (Electrically Erasable and Programmable Read Only Memory), in a compact thin plastic case of 21.5 mm×50 mm×2.8 mm, and various types of data such as image, audio, and music data is recordable on and readable from the memory stick 103 via a 10-pin terminal.

The Bluetooth communication unit 66 performs Bluetooth communication. The USB interface 58B transmits data to and receives data from an external device connected via the USB bus 60.

The IDE interface 58C includes two IDE controllers, i.e., a primary IDE controller and a secondary IDE controller, a configuration register, and so on (not shown).

The HDD 67 is connected to the primary IDE controller via the IDE bus 62. When an IDE device, such as a CD-ROM drive 68 or an HDD (not shown), is connected to another IDE bus, the connected IDE device is electrically connected with the secondary IDE controller.

The Ether connector 69 is connected to a network such as a LAN (Local Area Network). The Ether interface 58F transmits data to and receives data from the network connected to the Ether connector 69.

A BIOS (Basic Input Output System) 71, an I/O (Input/Output) interface 72, and a controller 73 are connected to an LPC bus 70. The BIOS 71 is a program group having a collection of basic operating commands of the personal computer 1, and is stored in, for example, a ROM (Read Only Memory). The BIOS 71 controls data exchange (input and output) between an OS or application program and a peripheral device.

A serial terminal 74 and a parallel terminal 75 are connected to the I/O interface 72 to transmit data to and receive data from devices connected to the terminals. The jog dial 23, the keyboard 24, a mouse 104, an AC power supply 76, etc., are connected to the controller 73. The details of the controller 73 are described below with reference to FIG. 6.

A PC card interface 78 and an IEEE 1394 interface 79 are connected to a PCI bus 77. The PC card interface 78 is used to supply the data supplied from a device (card) connected to a slot 33 to the CPU 51 or the RAM 54 and to output the data supplied from the CPU 51 to a card connected to a PC card slot. A drive 105 is connected to the PCI bus 77 via the slot 33 and the PC card interface 78.

The drive 105 reads the data recorded in a magnetic disk 111, an optical disk 112, a magneto-optical disk 113, or a semiconductor memory 114, which is connected to the drive 105, and supplies the read data to the RAM 54. The drive 105 is also capable of storing the data generated by the processing of the CPU 51 in the magnetic disk 111, the optical disk 112, the magneto-optical disk 113, or the semiconductor memory 114, which is connected to the drive 105.

The IEEE 1394 interface 79 transmits and receives IEEE 1394 data (packetized data) via an IEEE 1394 port 81.

Figure 6:
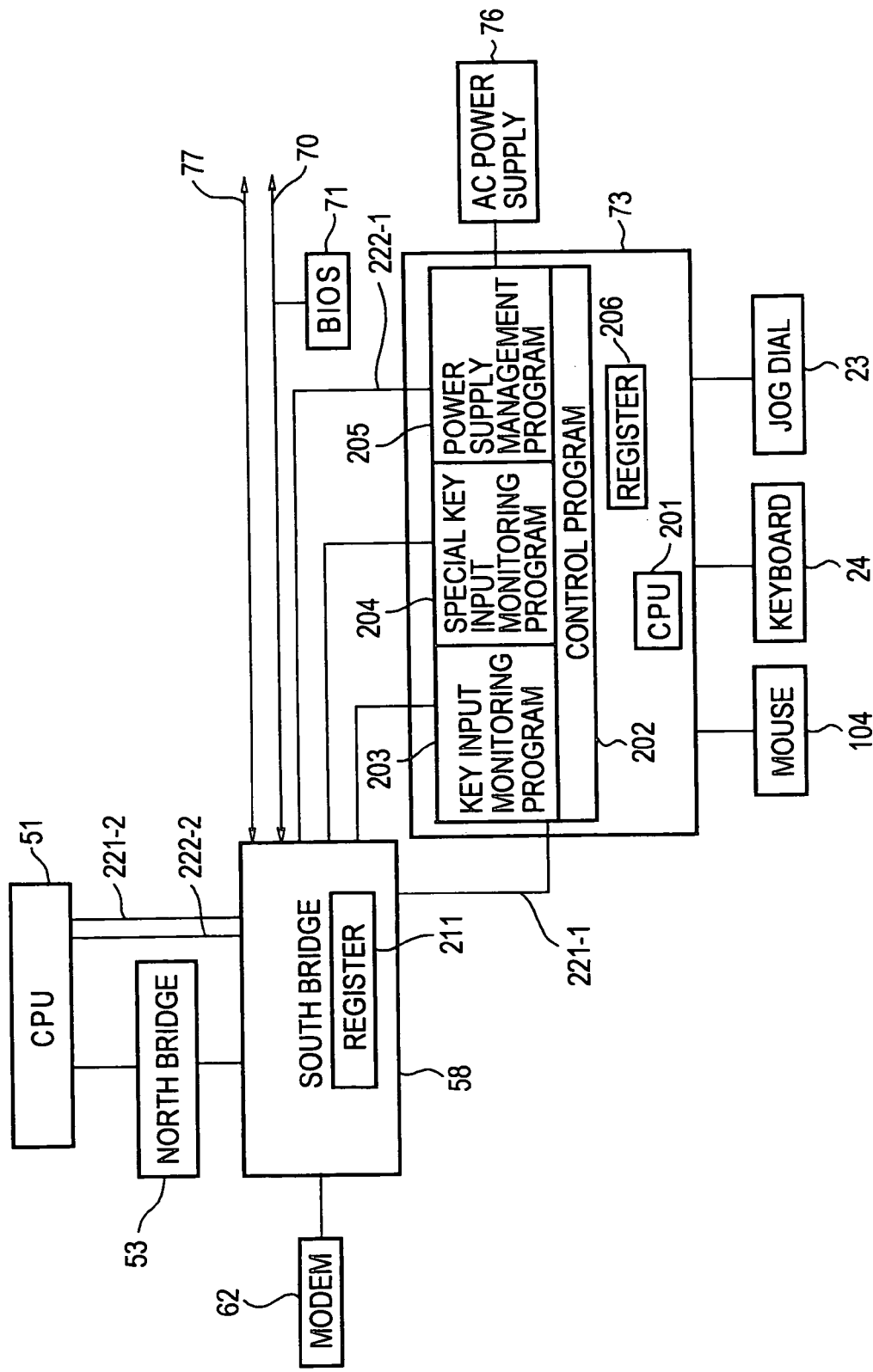
FIG. 6 is a block diagram showing an example of the internal structure of a controller 73.

FIG. 6 is a diagram showing an example of the internal structure of the controller 73. The controller 73 monitors data mainly from the keyboard 24 or the mouse 104. The controller 73 includes a CPU 201. The CPU 201 performs the processing according to a control program 202.

A key input monitoring program 203 is a program for monitoring an input from the keyboard 24 or the mouse 104. A special key input monitoring program 204 is a program for monitoring an input from a special key such as the jog dial 23. The special key is, for example, other than the jog dial 23, a hot key or a PPK (Programmable Power Key), and is a key corresponding to which the processing need be determined via a predetermined program.

A power supply management program 205 is a program for managing a battery or the AC power supply 76, and, for example, controls the supply of a necessary power supply voltage to the components of the personal computer 1.

The CPU 201 determines which program the input data is to be passed to according to the controller program 202. When the data is passed, each program checks the content of the passed data, and executes the corresponding processing.

The controller 73 further includes a register 206. Although FIG. 6 shows only one register, a plurality of registers 206 are provided, if necessary. The register 206 shown in FIG. 6 stores a flag indicating whether or not a power supply voltage is supplied from the AC power supply 76. The south bridge 58 also includes a register 211 for storing a flag indicating whether or not a dynamic change of the frequency of the CPU 51 is permissible.

The control program 202, the key input monitoring program 203, the special key input monitoring program 204, and the power supply management program 205 are connected to the south bridge 58 via interrupt lines. When each program receives a certain key input and executes processing to thereby output data, the data is transmitted to the south bridge 58 via the interrupt line.

Particularly, the interrupt line that connects the control program 202 to the south bridge 58 is referred to as an SMI line 221-1, and the interrupt line that connects the power supply management program 205 to the south bridge 58 is referred to as an SCI line 222-1. An SMI line 221-2 dedicated to transmission of interruption from the control program 202, and an SCI line 222-2 dedicated to transmission of interruption from the power supply management program 205 are also connected between the south bridge 58 and the CPU 51.

The SCI line 222-1 may employ a line in the LPC bus 70.

Recently, the CPU 51 with high frequency and relatively high consumption power has become widespread. The personal computer 1 shown in FIG. 1, such as a portable mobile computer or a notebook PC (personal computer), has also become widespread. For the purpose of portability, a notebook PC is powered by not only the AC power supply 76 but also a battery.

However, if the CPU 51 with high frequency and high consumption power is used in a notebook PC, it is necessary to reduce the consumption power to extend the battery driving time. In one known method for reducing the consumption power, for example, it is determined whether a power supply voltage is supplied from the AC power supply 76 or is supplied only from the battery, and the clock frequency of the CPU 51 is lowered to reduce the consumption power if it is determined that a power supply voltage is supplied only from the battery.

In the following description, the frequency change of the CPU 51 is referred to as frequency transition. In the following description, the frequency of the CPU 51 is set to a high frequency when a power supply voltage is supplied from the AC power supply 76, and the frequency of the CPU 51 is set to a low frequency when a power supply voltage is supplied from the battery. Therefore, the frequency is transitioned between two frequencies, i.e., a low frequency and a high frequency.

Lowering the CPU clock frequency (low frequency) includes reducing the clock frequency itself, and conducting so-called throttling or driving and not driving the CPU (that is, intermittently driving the CPU to reduce the average frequency) to thereby equivalently reduce the frequency.

Figure 7:
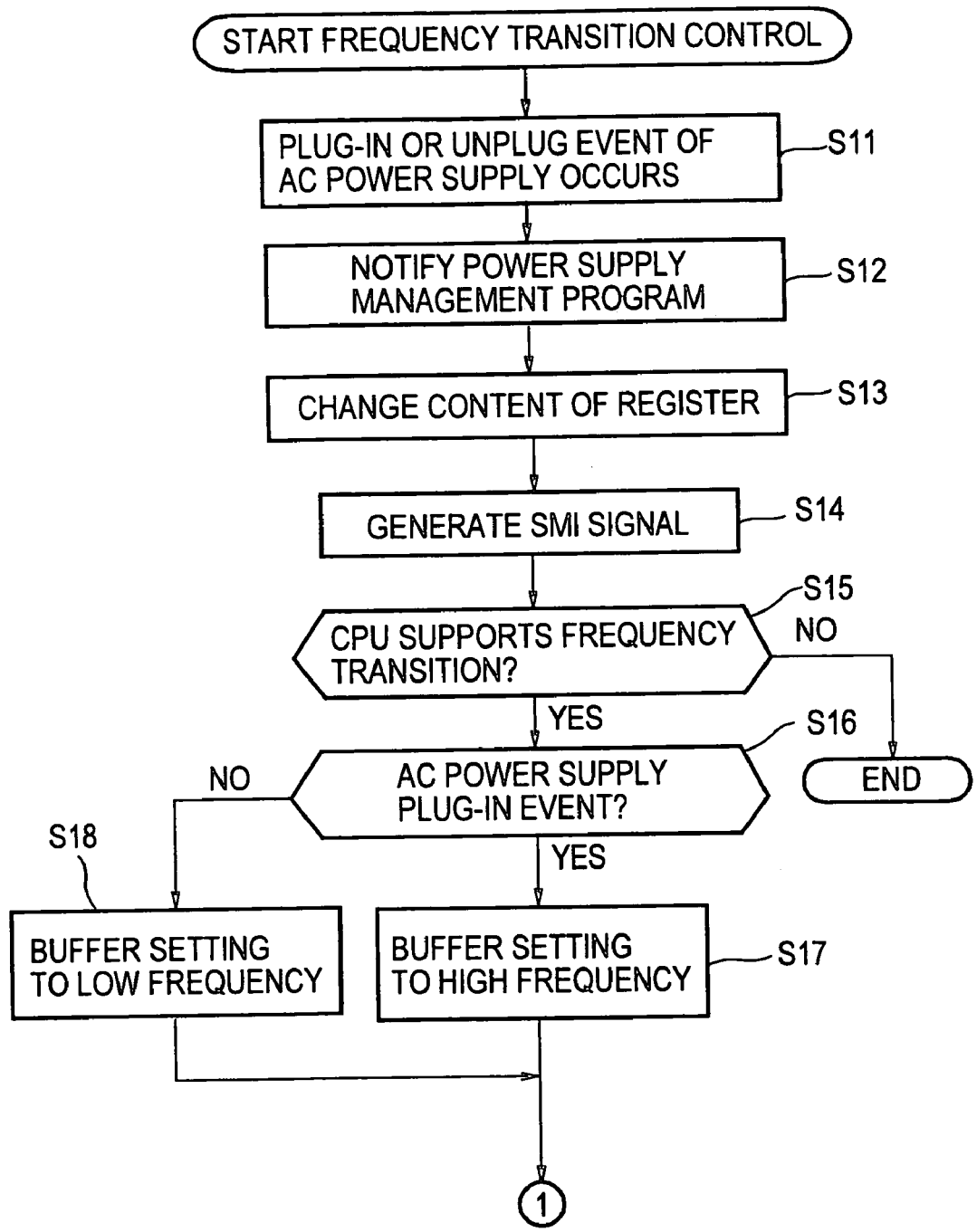
FIG. 7 is a flowchart showing frequency transition control.
Figure 8:
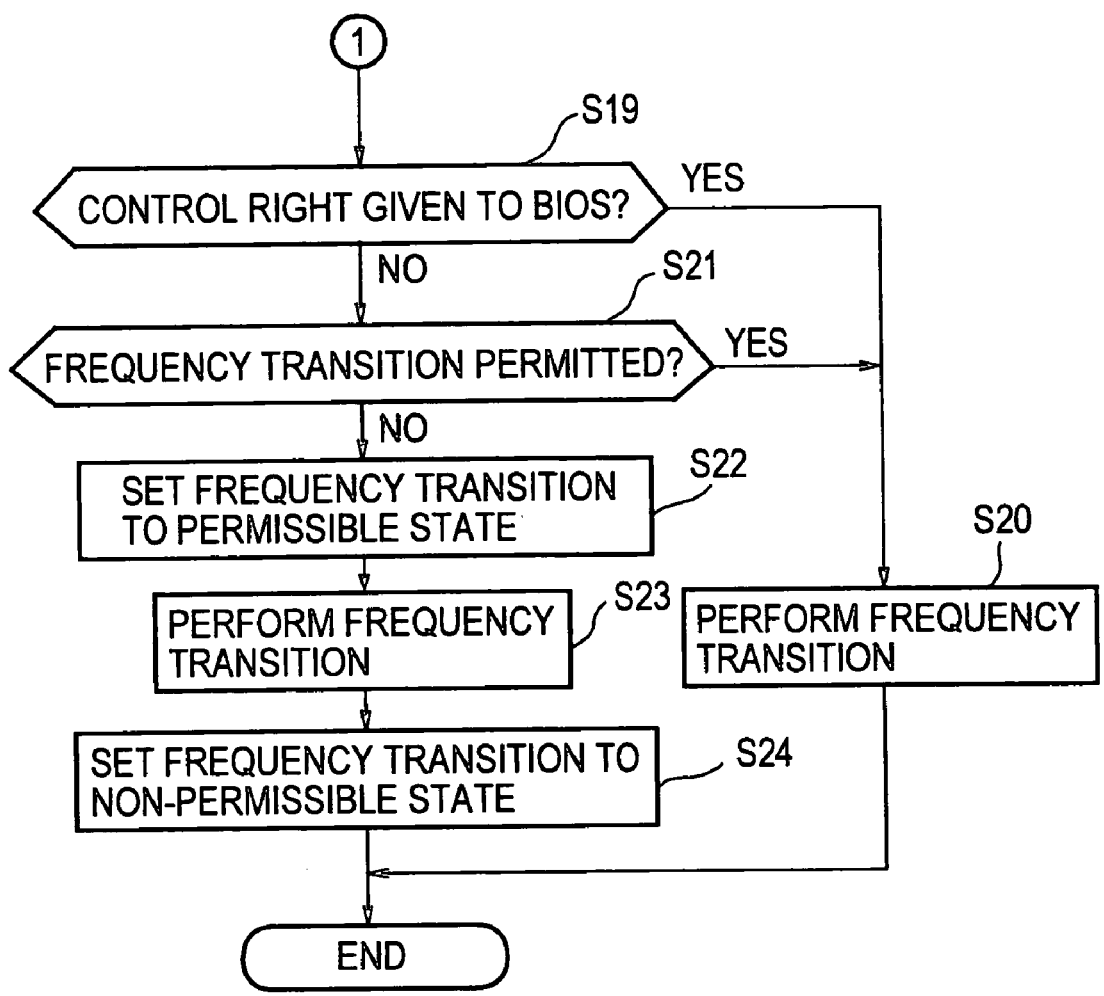
FIG. 8 is a flowchart subsequent to the flowchart shown in FIG. 7.

Such frequency transition control will be described with reference to the flowchart shown in FIGS. 7 and 8. In step S11, an event such as the AC power supply 76 being unplugged (i.e., the supply of power supply voltage is switched to a battery) or plugged in (the supply of power supply voltage is switched to the AC power supply) occurs.

Plug-in or unplug of the AC power supply 76 is managed by the controller 73. When a plug-in or unplug event of the AC power supply 76 is input to the controller 73, in step S12, the CPU 201 determines that this event is related to the AC power supply 76 according to the control program 202, and passes the input of the event to the power supply management program 205.

In step S13, if the power supply management program 205 determines the occurrence of a plug-in or unplug event of the AC power supply 76, it updates the register 206. For example, a flag is set in the register 206 so that the flag is on during the supply of power supply voltage from the AC power supply 76 and the flag is off during the supply of power supply voltage from a battery.

When the information stored in the register 206 is updated in step S13, then in step S14, an SMI signal is generated from the control program. The SMI signal is transmitted to the south bridge 58 via the SMI line 221-1, and is further transmitted to the CPU 51 via the SMI line 221-2.

When the CPU 51 receives the SMI signal, the processing after step S15 for an interruption is performed. In step S15, it is determined whether or not the CPU 51 is a frequency-transition-supported CPU. The determination in step S15 is performed because the CPU 51 does not necessarily support frequency transition and frequency transition control is conducted (can be conducted) only by a frequency-transition-supported CPU.

If it is determined in step S15 that the CPU 51 does not support frequency transition, it is impossible (unnecessary) to conduct frequency transition, and the frequency transition control process ends.

If it is determined in step S15 that the CPU 51 supports frequency transition, it is determined in step S16 whether or not this event is a plug-in event of the AC power supply 76 (i.e., whether or not this event is an event indicating that the power supply is switched to the AC power supply 76).

If it is determined in step S16 that this event indicates that the AC power supply 76 is plugged in, then in step S17, setting the frequency of the CPU 51 to a high frequency is buffered. If it is determined in step S16 that this event does not indicate that the AC power supply 76 is plugged in, in other words, if it is determined that this event indicates that the AC power supply 76 is unplugged, then in step S18, setting the frequency of the CPU 51 to a low frequency is buffered.

The term buffer means merely settings by which the frequency of the CPU 51 is set to a high frequency or a low frequency, and does not mean that actual frequency transition is conducted.

After the processing of step S17 or S18, then in step S19 (FIG. 8), it is determined whether or not the BIOS 71 has a control right. The control right indicates which program the personal computer 1 operates according to. The control right may be given to the BIOS 71 or any program other than the BIOS 71. Programs other than the BIOS 71 include an operation system and an application program.

If it is determined in step S19 that the BIOS 71 has a control right, the process proceeds to step S20. In step S20, the frequency of the CPU 51 is set (transitioned) to the frequency buffered in step S17 or S18.

If it is determined in step S19 that the BIOS 71 does not have a control right, it is determined in step S21 whether or not frequency transition is permissible. The processing after step S21 is performed according to the BIOS 71 although the BIOS 71 does not have a control right. The determination in step S21 is performed by referring to the information stored in the register 211 of the south bridge 58.

The register 211 has a flag indicating whether or not frequency transition is permissible. The state in which frequency transition is not permissible is a state in which an adverse effect may be caused by frequency transition. For example, frequency transition is not permissible during communication performed by the modem 62.

If frequency transition control is conducted during communication performed by the modem 62, the time required for the frequency transition control is accumulated as a delay, and thus a communication interruption can occur. Moreover, when the modem 62 is a software modem, the CPU 51 must constantly perform the processing during communication. Thus, if the frequency of the CPU 51 is dynamically transitioned, the communication can be interrupted. Therefore, it is written to the register 211 that frequency transition is not permissible during communication performed by the modem 62.

While communication performed by the modem 62 has been described by way of example, frequency transition may be set non-permissible during communication other than the communication performed by the modem 62, such as communication performed via wireless LAN (complying with the IEEE 802.11a or IEEE 802.11b standard) or communication performed by the Bluetooth communication unit 66.

The present invention can apply to such cases. Other than during communication, in a case where frequency transition is not permissible, the present invention can apply to this case.

If it is determined in step S21 that frequency transition is permissible by referring to the information stored in the register 211, frequency transition is conducted in step S20. If it is determined in step S21 that frequency transition is not permissible, the process proceeds to step S22.

In step S22, the CPU 51 resets the information stored in the register 211 of the south bridge 58 to the state in which frequency transition is permissible according to the BIOS 71. In this way, changing the setting to the frequency transition permissible state allows for frequency transition.

In step S23, frequency transition is conducted. The frequency transition processing in step S23 is similar to the frequency transition processing in step S20 described above, and a description thereof is thus omitted.

When the frequency transition processing in step S23 causes the frequency of the CPU 51 to be set to a high frequency or a low frequency, then in step S24, the information of the register 211 of the south bridge 58 is updated, and is reset again to the state where frequency transition is not permissible. Since, initially, the state where frequency transition is not permissible must be set in step S24, if the state where frequency transition is permissible is set, the state must be reset to the initial state.

Therefore, even if frequency transition is not permissible, this state is released to enable frequency transition processing. This can avoid a situation where the frequency of the CPU 51 is still maintained at a high frequency when the supply of power supply voltage is switched from the AC power supply 76 to the battery to thereby extend the battery driving time.

This can also avoid a situation where the frequency of the CPU 51 is still maintained at a low frequency when the supply of power supply voltage is switched from the battery to the AC power supply 76 to thereby maximize the capabilities of the CPU 51 when a power supply voltage is supplied from the AC power supply 76.

While control performed by the BIOS 71 has been described with reference to the flowchart of FIGS. 7 and 8, a frequency transition process may be performed by an operation system. When a plug-in or unplug event of the AC power supply 76 occurs, this event is transmitted to the CPU 51 via the SMI lines 221-1 and 221-2, and thereafter this event is also transmitted from the power supply management program 205 to the CPU 51 via the SCI lines 222-1 and 222-2.

The operation system performs a frequency transition process after the BIOS 71 has performed the above-described process. Thus, frequency transition has been conducted to set the frequency to the desired frequency. Even if the process is performed, frequency transition is not substantially conducted. Since frequency transition is set non-permissible during communication performed by the modem 62, the operation system does not substantially perform a frequency transition process.

The series of operations described above may be executed by hardware or software. When the series of operations is executed by software, a program constituting the software is installed from a recording medium to a computer incorporated in dedicated hardware or a general-purpose personal computer into which various programs are installed to perform various functions.

Figure 5:
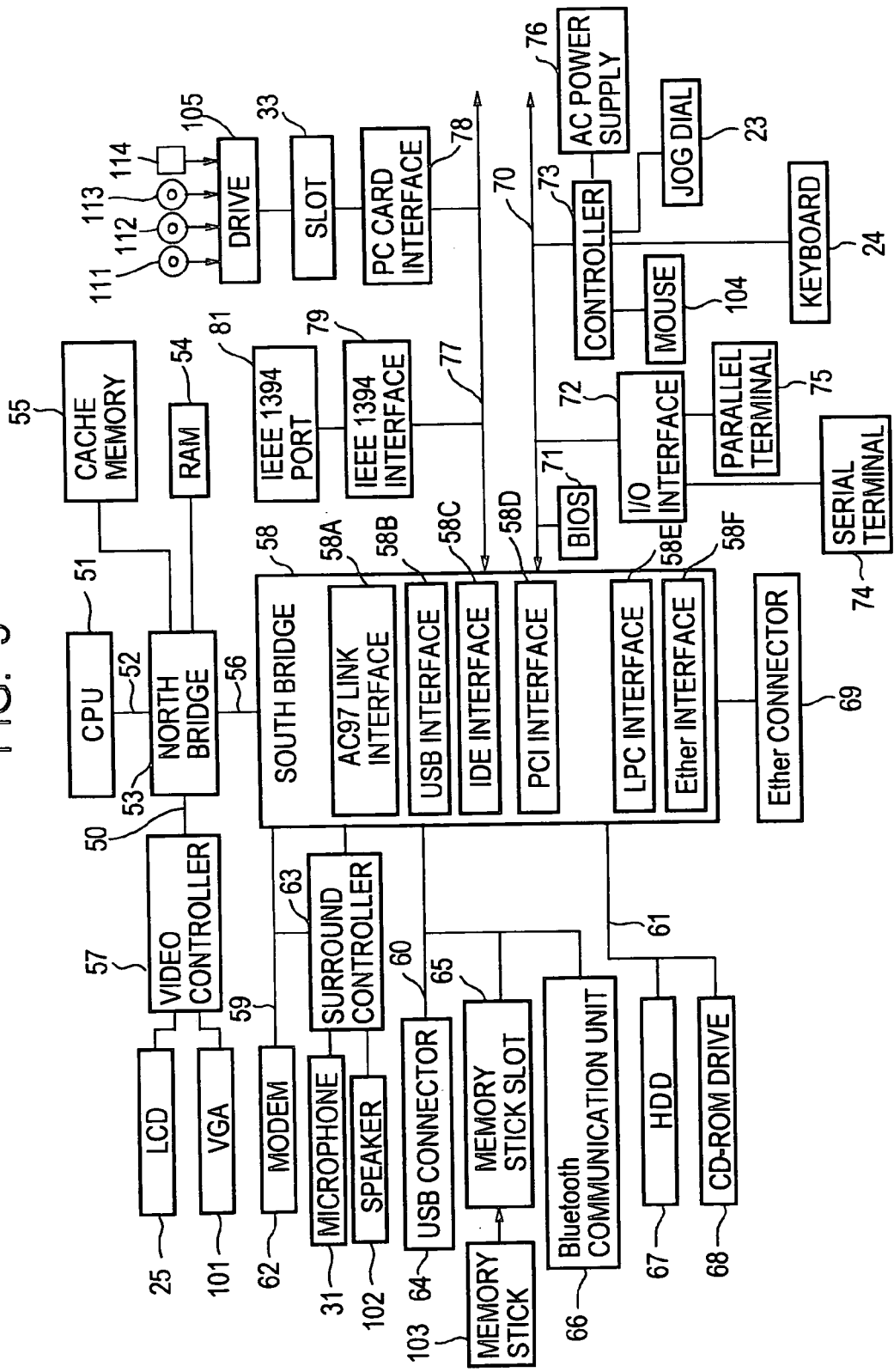
FIG. 5 is a block diagram showing an example of the internal structure of the personal computer shown in FIG. 1.

The recording medium may be formed of packaged media distributed separately from the personal computer for providing the program to a user, such as, as shown in FIG. 5, the magnetic disk 111 (including a flexible disk), the optical disk 112 (including a CD-ROM (Compact Disc-Read Only Memory) and a DVD (Digital Versatile Disc)), the magneto-optical disk 113 (including an MD (Mini-Disc) (registered trademark)), or the semiconductor memory 114, in which the program is recorded, or may be formed of a hard disk that contains a ROM or the HDD 67 in which the program is stored, which is provided to a user so as to be incorporated in advance into the computer.

In this document, the step defining the program provided by means of such a medium includes processes that are executed sequentially in orders described, and also includes processes that are executed in parallel or individually, not necessarily sequentially.

As used herein, the term system represents the overall apparatus composed of a plurality of devices.

INDUSTRIAL APPLICABILITY

According to the present invention, the clock frequency of a control device such as a CPU can be transitioned (changed).

Furthermore, according to the present invention, an inconvenience in which communication performed by a modem is interrupted when the clock frequency of a control device such as a CPU is transitioned can be avoided, and the frequency can be set to a desired frequency depending upon the situation.

The invention claimed is:

1. An information processing apparatus that operates with a clock having a predetermined frequency, said information processing apparatus comprising:
    changing means for changing the frequency of the clock;
    storing means for storing information indicating whether or not change of the frequency of the clock by the changing means is permissible;
    a Basic Input Output System (BIOS);
    means for determining whether the BIOS has a control right for the information processing apparatus;
    updating means for, when the information stored in the storing means is information indicating that the change of the frequency of the clock is not permissible and the BIOS does not have the control right, updating the information stored in the storing means into information indicating that the change of the frequency of the clock is permissible when the changing means changes the frequency of the clock; and
    resetting means for resetting the information stored in the storing means to the information indicating that the change of the frequency of the clock is not permissible after the information has been updated by the updating means and after the frequency of the clock has been changed by the changing means.

2. An information processing apparatus according to claim 1, wherein the changing means changes the frequency of the clock when a source supplying a power supply voltage is changed.

3. An information processing apparatus according to claim 1, wherein the updating means and the resetting means perform the processing according to the BIOS.

4. An information processing apparatus according to claim 1, further comprising:
    generating means for generating an event when an AC power supply is plugged in or unplugged; and
    buffering means for buffering information indicating that the frequency of the clock is set to a high frequency when the event generated by the generating means indicates that the AC power supply is plugged in, and buffering information indicating the frequency of the clock is set to a low frequency when the event indicates that the AC power supply is unplugged, wherein the changing means changes the frequency of the clock based on the information buffered by the buffering means.

5. An information processing apparatus according to claim 1, wherein the storing means stores information indicating that the change of the frequency of the clock is not permissible during communication performed by communication means.

6. An information processing method for an information processing apparatus that operates with a clock having a predetermined frequency, said information processing method comprising:

changing the frequency of the clock;

controlling storage of information indicating whether or not change of the frequency of the clock in the changing step is permissible;

determining whether a Basic Input Output System of the information processing apparatus has a control right for the information processing apparatus;

when the information stored in the storage controlling step is information indicating that the change of the frequency of the clock is not permissible and the BIOS does not have the control right, updating the information stored in the storage controlling step into information indicating that the change of the frequency of the clock is permissible when the frequency of the clock is changed in the changing step; and resetting the information stored in the storage controlling step to the information indicating that the change of the frequency of the clock is not permissible after the information has been updated in the updating step and after the frequency of the clock has been changed in the changing step.

7. A recording medium including computer program instructions which cause a computer to execute a method of controlling an information processing apparatus that operates with a clock having a predetermined frequency comprising:

changing the frequency of the clock;

controlling storage of information indicating whether or not change of the frequency of the clock in the changing step is permissible;

determining whether a Basic Input Output System of the information processing apparatus has a control right for the information processing apparatus;

when the information stored in the storage controlling step is information indicating that the change of the frequency of the clock is not permissible and the BIOS does not have the control right, updating the information stored in the storage controlling step into information indicating that the change of the frequency of the clock is permissible when the frequency of the clock is changed in the changing step; and resetting the information stored in the storage controlling step to the information indicating that the change of the frequency of the clock is not permissible after the information has been updated in the updating step and after the frequency of the clock has been changed in the changing step.

* * * * *